June 1, 1965 W. J. HANRAHAN 3,186,735
MULTIPLE COPY BUSINESS REPORT ASSEMBLY
Filed Nov. 26, 1963 3 Sheets-Sheet 1
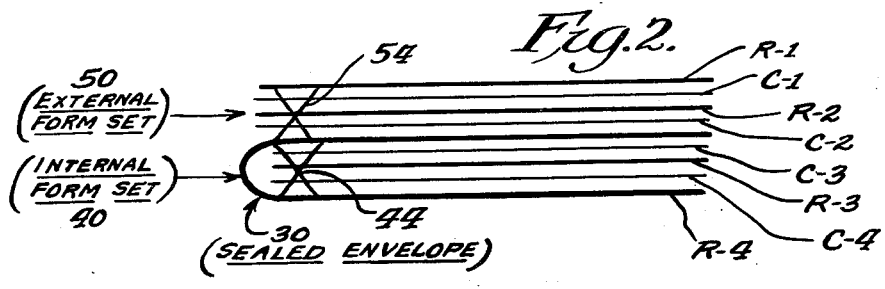
Inventor
William J. Hanrahan
By Mann, Brown & McWilliams
Attys.

June 1, 1965   W. J. HANRAHAN   3,186,735
MULTIPLE COPY BUSINESS REPORT ASSEMBLY
Filed Nov. 26, 1963   3 Sheets-Sheet 2
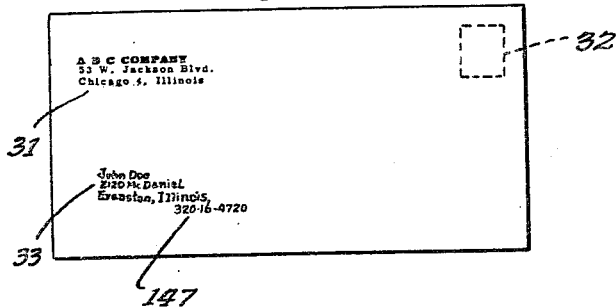
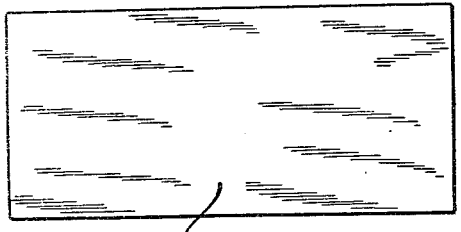
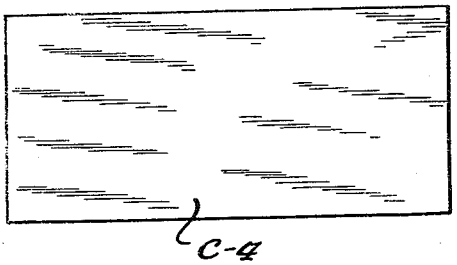
Inventor
William J. Hanrahan
By Mann, Brown & McWilliams
Attys.

June 1, 1965   W. J. HANRAHAN   3,186,735
MULTIPLE COPY BUSINESS REPORT ASSEMBLY
Filed Nov. 26, 1963   3 Sheets-Sheet 3
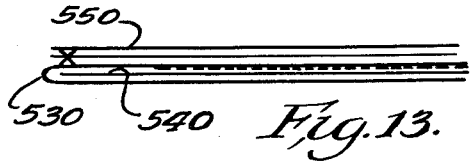
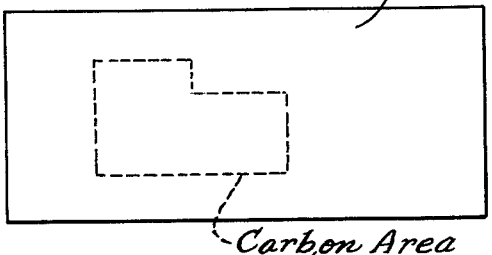
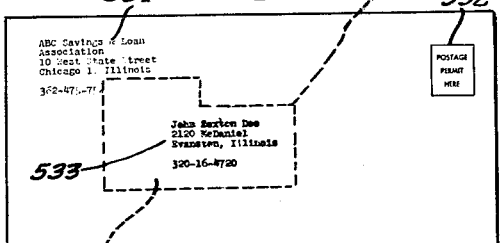
Inventor
William J. Hanrahan
By Mann, Brown & McWilliams
Attys.

3,186,735
MULTIPLE COPY BUSINESS REPORT ASSEMBLY
William J. Hanrahan, Maywood, Ill., assignor to American Envelope Company, a corporation of Illinois
Filed Nov. 26, 1963, Ser. No. 326,028
2 Claims. (Cl. 282—25)

This invention relates to multiple copy business report assemblies and particularly to such an arrangement where at least one of the report copies is to be mailed individually.

In many business situations, it is necessary to report bookkeeping transactions not only to individuals that may have been involved in the transactions, but also to report the transactions to the Internal Revenue Department. Thus, the copies of the report intended for the individual involved must be mailed individually, while the other copies of the reports are assembled into groups, one of which is usually sent to the Internal Revenue Department as a part of the tax report procedure, and another copy is usually assembled to constitute a group of file copies for the reporting company. One situation involving reports of the aforesaid character is provided by the usual W-2 tax report forms, and still another situation of this general kind is presented by the newly adopted reporting procedure concerning interest paid by banks, savings institutions, and dividends paid by corporate dispersing agents.

According to usual procedures, the report forms are produced in multiple copies through the use of various types of printing apparatus such as alpha-numeric line printers or in some instances through the use of embossed printing plates which are allocated to the various individuals to whom reports are to be made. When embossed plates are used, numerical or money data may be imprinted by use of a typewriter or other available business machines. After completion of the multiple copies of the reports, it has been common practice to separate the copies, insert one or more copies of each report into an individual envelope that has been appropriately addressed and these envelopes are then mailed to the individual named in the report. The other copies then are assembled into sets, one set of which constitutes the company record, while the other set is transmitted to the Internal Revenue Department.

The procedures that are thus involved in the conventional way of preparing multiple copy reports of the aforesaid character are quite involved and time consuming, and it is therefore the primary object of this invention to simplify the preparation and transmittal of multiple copy reports of the aforesaid character. Another and related object of this invention is to minimize the operations that must be performed by the company that is preparing the reports so that the reports may be prepared rapidly and may be quickly dispatched to the individuals involved and to the taxing authorities.

Another and more specific object of this invention is to provide a multiple copy reporting assembly wherein most of the text on the report is preprinted so that the minimum amount of printing or typing is required in the final report preparing procedures. Another important object is to provide such an assembly wherein all of the report sheets are in a predetermined relationship in the assembly with one or more of the report sheets being enclosed in a sealed envelope while one or more other report sheets are detachably secured in a predetermined relationship on the outside of the envelope, and to provide carbon transfer means whereby, in a single printing or typing operation, the required numerical data and identification data (including the name and address), may be produced on the enclosed report sheets and the externally mounted report sheet while at the same time producing the desired name and address on the envelope.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a plan view of the front face of multiple copy business report assembly adapted for reporting of withholding tax data and embodying the features of the invention;

FIG. 2 is a fragmentary and greatly enlarged vertical cross sectional view taken along the line 2—2 of FIG. 1;

FIG. 3 is a top plan view of the upper one of the report sheets embodied in FIGS. 1 and 2;

FIG. 4 is a plan view of the carbon paper sheet that underlies the report sheet of FIG. 1;

FIG. 5 is a plan view of the second report sheet and that overlies the carbon sheet of FIG. 4;

FIG. 6 is a plan view of the carbon sheet that overlies the report sheet of FIG. 5;

FIG. 7 is a plan view of the address face of the sealed envelope that forms part of the assembly of FIG. 1;

FIG. 8 is a plan view of a carbon sheet that is located in a fixed position within the envelope of FIG. 7 and immediately inside of the address face thereof;

FIG. 9 is a plan view of the upper report sheet that is located within the envelope of FIG. 7 immediately beneath the carbon sheet of FIG. 8;

FIG. 10 is a plan view of the carbon sheet that is located within the envelope of FIG. 7 immediately beneath the report sheet of FIG. 9;

FIG. 11 is a plan view of a second report sheet that is disposed within the envelope of FIG. 7 immediately beneath the carbon sheet of FIG. 10;

FIG. 12 is a plan view of the front face of multiple copy business report assembly adapted for use in reporting interest payments, and embodying the features of the invention;

FIG. 13 is a fragmentary and greatly enlarged vertical cross sectional view taken along the line 13—13 of FIG. 12;

FIG. 14 is a top plan view of the single external report sheet embodied in FIGS. 12 and 13;

FIG. 15 is a plan view of the carbon paper sheet that underlies the outer report sheet of FIG. 14;

FIG. 16 is a plan view of the inner report sheet that in the complete assembly is disposed within the sealed envelope; and FIG. 17 is a plan view of the address face of the sealed envelope that forms part of the assembly of FIGS. 12 and 13.

For purposes of disclosure the invention is herein illustrated as embodied in a multiple copy business report assembly 20 that is shown in plan in FIG. 1 and in cross section in FIG. 2, and which is particularly adapted for use in preparing withholding tax statements, or W-2 forms. Another embodiment of the invention for use in reporting interest payments will be described hereinafter.

The assembly 20 embodies a sealed envelope 30 that has an internal form set 40 located in a substantially fixed relationship within the sealed envelope 30, and an external form set 50 that is fixed and overlying the address face of the envelope 40, the form sheets 40 and 50 being arranged in what may be termed a registered relationship so that a printed impression produced by letter press printing on the top face of the external form set will be reproduced in a controlled relationship such that both identification and numerical data may be printed on the several forms of the assembly while the related name and address is imprinted on the envelope without the related numerical data.

The sealed envelope 30 is shown particularly in FIG. 7 of the drawings, and it will be noted that in this instance the flap side of the envelope has been utilized as the address face and a return address 31 is preprinted thereon at the upper left hand corner of the address face. In FIG. 7 an area 32 has been indicated at the upper right hand corner of the address face where postage may be placed, or where postal permit data may be preprinted on the envelope. On the address face of the envelope 30 as shown in FIG. 7, an individual name and address 33 is shown, this name and address being produced in the use of the report assembly of this invention as will be described in detail hereinafter.

The internal and external form sets 40 and 50 are generally similar and in the present instance each of these sets contains two report forms, but it will be recognized that these internal and external form sets may contain but one form or may contain more than one form, as required by the particular accounting and reporting situation that is involved. The internal set form 40 comprises two report forms R-3 and R-4 with a carbon paper sheet C-3 disposed on top of the report form R-3 and the carbon sheet C-4 disposed on top of the report form R-4 and immediately beneath the form R-3. It has been pointed out that the internal form set is positioned in a predetermined relationship with respect to the envelope 30, and in accomplishing this, carbons and report sheets that make up the internal form set 40 are made of such a size so as to fit snugly within the envelope 30 so as to prevent appreciable lateral shifting of the forms within the envelope. Moreover, the carbons and report of the internal form set are glued together at their left hand ends, as indicated schematically at 44 in FIG. 2, so that the carbons and report sheets may be handled as a group in associating the same with the envelope 30 in the desired relationship. Actually, the form set 40 is put in position on the envelope blank as the envelope 30 is being formed in a high speed envelope making machine so that when the flaps of the envelope are bent in succession and are glued together, the internal form set 40 is enclosed within the sealed envelope in the desired positional relationship.

The external form set 50 in the present instance comprises an upper report sheet R-1 and a lower report sheet R-2 with a carbon sheet C-1 disposed between the report sheets R-1 and R-2. The carbon sheet C-1 is of the same size as the report sheets R-1 and R-2. Beneath the lower report sheet R-2, a carbon sheet C-2 is located, the carbon sheet C-2 being relatively small in area and being positioned beneath the lower left hand portion of the report sheet R-2 so that the carbon sheet C-2 is located opposite and is confined substantially to the area where the name and address 33 is to be imprinted. Thus, the carbon C-2 is not effective to reproduce the numerical data. The report sheets R-1 and R-2 and the carbon sheets C-1 and C-2 are fixed together by adhesive at their left hand ends as indicated at 54 in FIG. 2 so that the form set may be handled by a high speed machine and may by this means be adhesively secured near its left hand end on the address face of the envelope 30 in a substantially registered relationship with respect to the internal form set 40.

The several report sheets R-1 and R-4 are of course generally similar insofar as the textual information carried thereby may be concerned, although this text may vary to some extent, as for example, in describing the use or final destination of the respective forms. An example of this type of variation in text is formed in the several copies of the income tax withholding tax statements usually referred to as form W-2. Such W-2 forms have been illustrated in the drawings with all of the usual text thereon and showing the variations or specialized text that is different on the different forms of a group. Thus as will be evident in the drawings, the report sheets R-1 to R-4 carry the usual text and guide lines 144 with specialized text 145 which is different on the respective forms. It might be pointed out that report sheets R-1 and R-2 correspond respectively to copies A and D of the usual W-2 forms, while report sheets R-3 and R-4 correspond respectively to copies B and C of the usual W-2 form group.

The several report sheets R-1 to R-4 have the name and address of the reporting company preprinted as at 131 in the upper left hand corner thereof, and beneath this name and address, the identification number of the reporting company is preprinted as at 146. It will be evident of course that the general text and guide line material is also preprinted on the several forms as at 144 and also that the specialized text 145 is preprinted on the forms.

Thus when the internal and external form sets 40 and 50 are fixed in position with relation to the sealed envelope 30 in the manner above described, any form of the letter press printing may be utilized for printing the name and address of the person to whom the report relates as at 133 in the lower left hand portion of the upper form R-1, and in this same imprinting process, the identifying number 147 related to the person may be printed at 147, and by the same printing means, or in a separate printing or typing operation, the related numerical or money data that is required may be printed at 148 of the upper form R-1.

When the data 133, 147 and 148 are thus imprinted on the upper report sheet R-1, the several carbons cause the name and address impression 133 to be reproduced on the report forms R-2, R-3, and R-4 as well as on the envelope 30 as indicated at 33 in FIG. 7. Similarly, the identifying number 147 is reproduced as a carbon impression on the forms R-2 and R-3 and R-4, and depending upon the size and location of the carbon sheet C-2, this identifying number may also be reproduced as indicated at 147 on the envelope 30 as shown in FIG. 7.

The numerical or money data 148 that is imprinted on the upper form R-1 is similarly imprinted as a carbon impression at 148 on the forms R-2, R-3 and R-4, but since these impressions 148 are located upwardly beyond the upper border of the carbon sheet C-2, such impressions 148 are not reproduced on the address face of the envelope 30 as will be evident in FIG. 7 of the drawings.

In the following Chart I, the general character of the various items of data or text are related to the several report forms and the envelope through the use of symbols that indicated the manner of producing the printed data or text under the present invention:

CHART I

*Character, location and manner of imprinting the principal items of data on multi-copy reporting assembly*

|   |   | External set | | Enve- lope | Internal set | |
|---|---|---|---|---|---|---|
|   |   | Form No. 1 | Form No. 1 |   | Form No. 3 | Form No. 4 |
| 1 | Name and address of reporting company. | P | P | P | P | P |
| 2 | Identifying number of company. | P | P |   | P | P |
| 3 | Descriptive text concerning transaction. | P | P |   | P | P |
| 4 | Text describing use of respective forms. | P | P |   | P | P |
| 5 | Money amounts involved. | X | C |   | C | C |
| 6 | Name and address of payee. | X | C | C | C | C |
| 7 | Identifying No. (S.S. or Int. Rev.). | X | C | O | C | C |

Symbols:
P—Preprinted individually.
X—Typed or printed by letter press printing on Form No. 1.
C—Carbon impression from X.
O—Optional as a carbon impression.

As thus broadly characterized in Chart I, it will be evident that the present invention is applicable to a wide variety of commercial situations. Thus it will be evident that the same principles and the same general physical arrangement of parts may be employed for a multiple copy reporting assembly that is specifically adapted for reporting interest payments and/or credits by banks, savings institutions and the like. Similarly, this invention may be applied to reporting of trust account transactions by banks and like companies.

Another situation to which this invention is applicable is in the reporting of dividend payments or combined reports that cover capital gains distributions and dividends in the manner employed by the dispersing agents for mutual funds.

In all of these different situations the number of report forms in either the internal or the external set may be varied as required, and is limited only by the capabilities of the printing apparatus that is used.

In FIGS. 12 to 17 of the drawings the invention is illustrated as embodied in a multiple copy business report assembly 520 that is shown in plan in FIG. 12 and in cross section in FIG. 13, and which is particularly adapted for use in reporting interest payments. The assembly 520 embodies a sealed envelope 530 that has an internal form set 540 located in a substantially fixed relationship within the sealed envelope 530, and an external form set 550 that is fixed and overlying the address face of the envelope 530, the form sets 540 and 550 being arranged in what may be termed a registered relationship so that a printed impression produced by typing or letter press printing on the top face of the external form set 550 will be reproduced in a controlled relationship such that both identification and numerical data may be performed on the several forms of the assembly while the related name and address is imprinted on the envelope without related numerical data.

The envelope 530 is shown particularly in FIG. 17 of the drawings, and a return address 531 is preprinted thereon at the upper left hand corner of the address face. In FIG. 17 an area 532 has been indicated at the upper right hand corner of the address face where postage may be placed, or where postal permit data may be preprinted on the envelope. On the address face of the envelope 530 as shown in FIG. 17, an individual name and address 533 is shown, this name and address being produced in the use of the report assembly of this invention as will be described.

The internal and external form sets 540 and 550 are specifically different from the structures hereinbefore described in that these internal and external form sets 540 and 550 contain but one form, this being the minimum required by the particular accounting and reporting situation that is involved. The internal set form 540 comprises a single card-like report form R–13 with a pattern printed carbon area C–13 disposed over the report form R–13 and preprinted on the inner face of the address side of the envelope 530. The internal form or report R–13 is positioned in a predetermined relationship with respect to the envelope 530, and in accomplishing this, the report sheet R–13 is made of such a size so as to fit snugly within the envelope 530 so as to prevent appreciable lateral shifting of the form within the envelope. The form R–13 is put in position on the envelope blank as the envelope 30 is being formed in a high speed envelope making machine so that when the flaps of the envelope are bent in succession and are glued together, the internal form R–13 is enclosed within the sealed envelope in the desired positional relationship.

The external form set 550 comprises an upper report sheet R–10 with a pattern printed carbon sheet C–10 disposed beneath the report sheet R–10. The carbon sheet C–10 is of the same size as the report sheet 10, and a relatively small and accurately located area of the sheet C–10 is pattern printed with carbon transfer material opposite the area where the name and address 533 is to be imprinted. The report sheet R–10 and the carbon sheet C–10 are fixed together by adhesive at their left hand ends so that the form set 550 may be handled by a high speed machine and may by this means be adhesively secured near its left hand end on the address face of the envelope 530 in a substantially registered relationship with respect to the internal form R–13.

The report sheets R–10 and R–13 are of course generally similar insofar as the textual information carried thereby may be concerned, although this text may vary to some extent as for example in describing the use or final destination of the respective forms.

The report sheets R–10 and R–13 have the name and address of the reporting company preprinted as at 531 in the upper left hand corner thereof, and beneath this name and address, the identification number of the reporting company is preprinted as at 546. It will be evident of course that the general text and guideline material is also preprinted on the several forms as at 544 and also that the specialized text 545 is preprinted on the forms. Here again, any form of the letter press type printing may be utilized for producing the name and address of the person to whom the report relates as at 533 in the lower left hand portion of the upper form R–10 and in this same imprinting process, the related identifying number 547 may be printed and by the same printing means or in a separate printing or typing operation, the related numerical or monetary data may be printed at 548 of the upper form R–10.

When the data 533, 547 and 548 are thus imprinted on the upper report sheet R–10, the carbon transfer means cause the name and address impression 533 to be reproduced on the report form R–13 as well as on the envelope 530 as indicated at 533 in FIG. 17. Similarly, the identifying number 547 is reproduced as a carbon impression on the envelope and on the internal form R–13. The numerical or money data 548 that is imprinted on the upper form R–10 is similarly imprinted as a carbon impression at 548 on the form R–13 but since these impressions 548 are located upwardly beyond the upper border of the carbon area of sheet C–2, such impressions 548 are not reproduced on the address face of the envelope 530 as will be evident in FIG. 17 of the drawings.

From the foregoing description it will be evident that the present invention provides an extremely simple and advantageous report form assembly that simplifies the preparation and transmittal of multiple copy reports. It will be evident also that under the present invention, the number of operations performed by the reporting company is minimized so that the work may be preformed rapidly and economically.

It will also be apparent that the present invention requires the minimum amount of equipment for the preparation and distribution of the report forms.

Thus while preferred embodiments of the invention have been illustrated herein, it is to be understood that changes and variations may be made by those skilled in the art without departing from the spirit and scope of the appended claims.

I claim:

1. In a multiple copy report form assembly for use by a reporting company in preparing and transmitting reports of its transactions with other companies or individuals, a sealed envelope of the type comprising a single sheet of paper with all four edge margins of the envelope constituting a fold in said sheet, and with one such fold forming the flap of the sealed envelope, said envelope having an address face which includes an address receiving area, first and second report sheets, said report sheets having identically located first and second data receiving areas adapted to have transaction data and recipient identifying data respectively applied thereto, said first report sheet being disposed in a substantially fixed position within said sealed envelope, a pressure sensitive transfer means carried as a printed pattern on the inside face of the address face of the envelope, which pattern is located over both data receiving areas of said first report sheet, and said second report sheet being removably attached to the address face of said sealed envelope and having pressure sensitive transfer means disposed beneath said second identifying data area of said second report sheet and exclusive of said first data receiving area, whereby the pressure application of transaction and recipient identifying data on said second report sheet will transmit all such data to the first report sheet within said sealed envelope, but will transmit only the recipient identifying data to the address face of the sealed envelope.

2. A multiple copy report form assembly as set forth in claim 1 in which a third report sheet overlies the second report sheet and is similarly removably attached to the envelope, and in which pressure sensitive transfer means are interposed between the third report sheet and the second report sheet with such last mentioned transfer means being co-extensive with both of said data receiving areas.

References Cited by the Examiner

UNITED STATES PATENTS

| 927,543 | 7/09 | Irvin | 282—25 |
| 1,294,912 | 2/19 | Irvin et al. | 282—25 |
| 2,156,142 | 4/39 | Blitz | 282—25 |

FOREIGN PATENTS 511,042  5/52  Belgium.

JEROME SCHNALL, Primary Examiner.

LAWRENCE CHARLES, Examiner.

UNITED STATES PATENT OFFICE
CERTIFICATE OF CORRECTION

Patent No. 3,186,735                                        June 1, 1965

William J. Hanrahan

It is hereby certified that error appears in the above numbered patent requiring correction and that the said Letters Patent should read as corrected below.

Column 5, CHART I, sub-heading to fourth column thereof, for "Form No. 1" read -- Form No. 2 --.

Signed and sealed this 19th day of October 1965.

(SEAL)
Attest:

ERNEST W. SWIDER                                EDWARD J. BRENNER
Attesting Officer                                    Commissioner of Patents